(12) United States Patent
Rankine

(10) Patent No.: US 11,972,696 B2
(45) Date of Patent: *Apr. 30, 2024

(54) BEAD-ON-TILE APPARATUS AND METHODS

(71) Applicant: Anthony John Rankine, Hickory, NC (US)

(72) Inventor: Anthony John Rankine, Hickory, NC (US)

(*) Notice: Subject to any disclaimer, the term of this patent is extended or adjusted under 35 U.S.C. 154(b) by 603 days.

This patent is subject to a terminal disclaimer.

(21) Appl. No.: 16/976,460

(22) PCT Filed: Feb. 24, 2019

(86) PCT No.: PCT/US2019/019329
§ 371 (c)(1),
(2) Date: Aug. 27, 2020

(87) PCT Pub. No.: WO2019/168769
PCT Pub. Date: Sep. 6, 2019

(65) Prior Publication Data
US 2021/0005107 A1 Jan. 7, 2021

Related U.S. Application Data

(63) Continuation-in-part of application No. 15/906,374, filed on Feb. 27, 2018, now Pat. No. 10,839,719.

(51) Int. Cl.
G09B 19/02 (2006.01)
G09B 1/04 (2006.01)
G09B 23/20 (2006.01)

(52) U.S. Cl.
CPC ............. *G09B 19/02* (2013.01); *G09B 1/04* (2013.01); *G09B 19/025* (2013.01); *G09B 23/20* (2013.01)

(58) Field of Classification Search
CPC .................................................. G09B 23/02
See application file for complete search history.

(56) References Cited

U.S. PATENT DOCUMENTS 2,304,893 A   12/1942  Dickson
4,334,869 A   6/1982  Wilcox et al.
(Continued)

FOREIGN PATENT DOCUMENTS

CA    2950116 A1    5/2018
CN    204348151 U   5/2015
(Continued)

OTHER PUBLICATIONS

"The Use of Overlay Charts: A Device for Teaching Some Number Concepts," Machlin, R., The Arithmetic Teacher, vol. 8, No. 8 (Dec. 1961), pp. 433-435 (Year: 1961).*
(Continued)

*Primary Examiner* — Kurt Fernstrom
(74) *Attorney, Agent, or Firm* — CHRISTOPHER C. DREMANN, P.C.; Christopher C. Dremann

(57) ABSTRACT

Apparatus and methods for providing instruction include at least one instruction site defining an instruction board and at least one instruction piece configured to be received on the instruction site. A user manipulates the at least one instruction piece to perform a change of state operation relating to the instruction. The apparatus and methods are based on applied cognitive science, where children play the lead role in storylines staged upon a rule-enforcing apparatus and by so doing, become self-enlightened about denumerability, rank-wise denumerability, addition, subtraction, multiplication, division, and other change-of-state processes encountered in mathematics and the quantifiable sciences.

20 Claims, 14 Drawing Sheets

(56) References Cited

U.S. PATENT DOCUMENTS

| | | | | |
|---|---|---|---|---|
| 5,039,603 A | * | 8/1991 | Pocius | G09B 19/02 434/188 |
| 5,520,541 A | * | 5/1996 | Shedeur | G09B 19/025 273/272 |
| 5,971,269 A | | 10/1999 | Baguley | |
| 8,529,266 B1 | * | 9/2013 | Akin | G09B 19/02 434/191 |

FOREIGN PATENT DOCUMENTS

| | | |
|---|---|---|
| CN | 204 740 770 U | 11/2015 |
| FR | 2 892 946 A1 | 5/2007 |
| GB | 2 313 404 A | 9/1997 |
| WO | 2016102514 A1 | 6/2016 |
| WO | 2017137816 A1 | 8/2017 |

OTHER PUBLICATIONS

International Searching Authority (EP/ISA), International Search Report and Written Opinion of the International Searching Authority, May 24, 2019 (May 24, 2019), 12 pages, European Patent Office, Rijswijk, Netherlands (NL).

China National Intellectual Property Administration, First Office Action in corresponding national phase Chinese Patent Application No. 201980015642X, Apr. 25, 2021, 3 pages, Guangzhou, Guangdong, China.

National Centre of the Intellectual Property "Sakpatenti" Georgia, The Documentary Conclusion in corresponding national phase Georgia Patent Application No. AP 2019 15438, May 13, 2021, 3 pages, Mtskheta, Georgia.

* cited by examiner

Prior Art – Ayala Yupana, Rotated 90° CCW

| 632M Multiplication | | | 632M Division |
|---|---|---|---|
| | 2772 | 6  2772 | |
| | 1386 | 3  1386 | |
| 7273561 | 924 | 2  924 | 7273561 |
| × | 462 | M  462 ) | 3360385182 |
| 2772000000 | | | 2772 |
| | | 7 | 588 |
| 462000000 | | | 462 |
| | | | 1263 |
| 92400000 | | 2 | 924 |
| | | | 3398 |
| 27720000 | | | 2772 |
| | | 7 | 626 |
| 4620000 | | | 462 |
| | | | 1645 |
| 1386000 | | 3 | 1386 |
| | | | 2591 |
| 138600 | | | 1386 |
| | | 5 | 1205 |
| 92400 | | | 924 |
| | | | 2818 |
| 27720 | | 6 | 2772 |
| | | | 462 |
| 462 | | 1 | 462 |
| 3360385182 | | | 000 |

FIG. 11

BEAD-ON-TILE APPARATUS AND METHODS

FIELD OF THE INVENTION

The present invention relates to apparatus and methods designed to provide children grounding, insights, and self-directed instruction in mathematics and the quantifiable sciences.

BACKGROUND OF THE INVENTION AND RELATED ART

Subitization is about the power of three. Every animal is innately equipped to make three field of view distinctions, namely right, center and left. The present invention taps into this power to subitize. Additionally, in humans there are vertical strata, namely, ground level, eye level and overhead. This overall creates a three-by-three zoned matrix totaling nine zones of alertness. Hence, radix-10 numericity is a natural fit for super-subitized perception in humans. Fingers and finger counting is irrelevant.

Using modular components, the present invention has broad scope of application to all quantifiable science. However, radix-10 mathematics will be the focus of this disclosure because radix-10 mathematics is the first quantitative science children experience. As long as the invention taps into their subitization arsenal, children are innately equipped to auto-acquire the principles behind mathematics and other quantifiable sciences. The apparatus, on which they play and learn, must reinforce correctness and minimize the potential for goof-ups and self-doubt.

Apparatus according to the invention, such as depicted in FIG. 1B in one of its many adaptable multi-register forms, in this case a three row/register, five rank, one tray setup, has no prior art. The closest facsimile, merely in terms of possessing a planar layout, was postulated from a hand sketch in the archives of the Royal Danish Library in 1908. Within a solitary, hand-written manuscript dating to 1615 titled "El Primera Nueva Coronica y Buen Gobierno" by its author, Felipe Guaman Poma de Ayala, is a sketch of what modern historians call the Ayala Yupana, an Incan abacus. Ayala's hand sketch is reproduced in FIG. 1A, rotated 90° counterclockwise. No other sketch like it exists and no physical embodiment of it has ever been unearthed. Nor does anyone know what tokens were used on the Ayala Yupana. Despite the fact that it is naturally designed for a radix-12 number system, several western-centric radix-10 numerical models have been force-fit so the Ayala Yupana functions as a planar, single register, radix-10 abacus. In 2001, Nicolino de Pasquale proposed a radix-40 model.

SUMMARY OF THE INVENTION

In one aspect of the invention, the preferred instruction site for radix-10 numeric state representations is a compact, super-subitized, square tile, on which instruction pieces are moved into instruction locations on an instruction board. In exemplary embodiments, the instruction site is referred to as a "Digit-Square," the instruction pieces are referred to as "beads," the instruction locations are referred to as "bead sites" and the instruction board is referred to as a "Candy Board." Sculpted into the design of the tile is a subitize-informed bead site layout that breathes life into the super-subitization perceptiveness capability of the human brain. A tenth bead site, representing a saturation state, comparable to all ten fingers outstretched, is located in the top left corner of each Digit-Square.

Preferably, the appropriate cultural and language glyph is printed within the bounds of each bead site and on the tile. For example, the bead site layout of FIG. 2A depicts a right to left magnitude sequence (left is greater) with ascending row/echelons (above is greater), imprinted with conventional Hindu-Arabic digit glyphs, namely "0" through "9". Typographic glyphs act as stepping stones so that, in due course, children self-acquire adult symbol usage. As FIGS. 6AA through 6JJ make clear, when beads occupy bead sites on a Digit-Square, the bead count, the bead pattern, and numeric value/state is reinforced by the numeric glyph in the next higher bead site. FIG. 6KK depicts the "TEN" saturation state.

The invention applies the golden rule: without relatability, learning is imposition not acquisition. On the Digit-Square, starting at "0" incrementing to "TEN" involves eleven states and ten changes of state, as depicted in the eleven FIGS. 6AA through 6KK. What children see visually are eleven states. What children don't see visually are the ten changes of state because those are mental constructs called counting, i.e. changes of state via incrementing.

Another form of instruction site is the "Tray" tile. Compatible with the Digit-Square tile, the Tray tile is depicted in FIG. 3A in a plan view and in section views in FIG. 3B and FIG. 3C, also showing the preferred bead. Tray tiles serve as bead repository adjuncts to adjoining Digit-Squares.

One or more tiles, such as Digit-Squares and Trays, may be assembled into a unified tessellation in an embodiment of an instruction board referred to as a "Candy Board" for the parlance of children. Examples are depicted in FIG. 2A, being a stand-alone unit tile, and in FIG. 1B, FIG. 4 and FIG. 5, being a unity of plural tiles adhering to a schema of tessellation.

Candy Boards according to the invention can be custom-module assembled from tile and tile composites interconnected through various interlocking mechanisms including bridging tiles and base mats, to create a desired schema of tessellation. Candy Boards can also be single-molded ready-to-play units with a single row, mimicking an abacus, or two-row, three-row and higher order assemblages, with or without built-in Trays. FIGS. 1B, 4, 5, 9A and 9B are examples of such problem-focused layouts.

Bead sites, preferably bearing printed indicia, are preferably recessed into the tile substrate to create a cavity-mating profile with beads, namely instruction pieces. While all bead sites, such as depicted in FIG. 2A and shown in section in FIGS. 2B and 2C, are preferably circular-dimple in form to be compatible with candy beads such as M&M'S® candies, they can take any predetermined form.

Choking hazards should be avoided at all costs. Because candy is cheap, there is no reason not to use edible beads. Conforming to the dimensions of M&M'S® candies, SKITTLES® candies and SMARTIES® candies, the preferred beads are generally round, elliptical or ovulate, finger-friendly candy.

As depicted in the Digit-Square of FIG. 2A, two horizontal channels and one vertical channel provide bead sliding pathways because sliding is preferred over placement. These channels frame three edges that surround and thus define a bead site plateau region. For other science modeling, such as the electron shells of an atom, channels and plateau regions may number more than one.

Preferably, the Digit-Square is hemmed in by a right bead-control fence and a left bead-control fence. Such fencing aims to enforce tile grouping, such as the rank system, i.e. numeric order of magnitude. Similar to and compatible with a Digit-Square's enforcement of tile grouping, each Tray has three fences to confine beads to a given rank. One primary objective of the method of plosive-state equilibration is to straddle or to hurdle fencing that divides the Candy Board into ranks or groups.

Mathematical order of magnitude conventions map directly to the Candy Board's Digit-Square ranking system. For example, in FIG. 4 depicting a three-row, four rank Candy Board, a decal marks the Candy rank. All higher ranks tessellate leftward, such as the Packet rank, depicted in FIG. 4 using an alternative clipart decal, and so on Mimicking the real world, ranks of candy containment use child-friendly names and images, such as Packets, Bags, Boxes and so on.

Preferably, each Digit-Square of the same rank is colored and color consistent. Hence, a full-scale Candy Board appears as a series of vertical strips in a light-shade of color that correlate with a set of rank-specific beads in a darker-shade of similar color.

Preferably, Trays use color to delineate rank that is compatible with the color used by Digit-Squares of the same rank. Preferably, label decals or clipart decals denote the rank to which the Tray pertains. As depicted in FIG. 4, for example, one or more Tray tiles act as bead repositories in conjunction with one or more Digit-Square tiles when setup in a given singular tessellation embodiment. Other such embodiments are depicted in FIG. 1B, FIG. 5, FIG. 9A and FIG. 9B.

Physical bead movement on structured, rule-enforcing terrain, such as rows and ranks, fences, channels and bead site stamped with a location or number, can be threaded into a storyline and expressed unambiguously via navigation directions. Consequently, storytelling on a physical Candy Board can be a means for demonstrating concepts that are not easily explained. In essence, beads are like pretend cars that drive back and forth between homes, namely bead sites, and color-coordinated parking lots, namely Trays.

FIGS. 6A through 6J along the left-hand margin of the drawings depict stencils optionally bearing indicia, and with optional cutouts. When placed over a Digit-Square, stencils are the preferred means for enforcing the setup of the correct stencil-specific bead count and bead pattern. Cutouts permit the underlying glyph printed in the predetermined bead site on the Digit-Square to show through. This reinforces bead pattern to numeric symbol association. Cutouts can also function as plosive-state bead sites. This emulates radix choking, where the radix of a Digit-Square is reduced, as illustrated in FIGS. 8A, 8B and 8E, and as applied to the clock tessellation of FIG. 9A.

Preferably, indicia bearing chips, as depicted in FIG. 6K and FIG. 7 as a set, act as substitutes for beads laid on the Digit-Square. Chips are the primary means for weaning a child away from bead patterns. Chips are also one means for manifesting algebraic substitution on the Candy Board.

In another Digit-Square customization, using decals if desired, FIG. 8D depicts how a kludge on the radix-10 Digit-Square can emulate radixes up to hexadecimal, i.e. ounces, and for radix-12, i.e. inches or hours, as depicted in FIG. 8C.

Although game-play on a physical Candy Board is preferred, especially during a child's earliest learning phases, computer-proctored display devices designed around the layout and techniques of a physical Candy Board provide greater flexibility for dynamically animating storylines in more sophisticated games, or where detection and correction of erroneous game-play is paramount.

Be it stand-alone intelligent Digit-Squares, computer connected Digit-Squares, or display device Digit-Square analogues, in a computer-proctored embodiment of the apparatus, storylines are preferably presented as text, audio or video, or any combination thereof. Be it localized to a school or distributed via the Internet, a computer-networked embodiment enables an instructor to walk students through a generic problem, but one where each student has a unique instance of the problem on his personal display device to resolve.

Computer-proctored embodiments are well suited to rigorously enforcing the storyline and the rules of the problem at hand. For example, the computer-proctored device can flag an instructor to intercede, or can handle simple matters on its own. For example, enforcing the order in which bead/icons are placed so the child adheres to "0" followed by "1," followed by "2" and followed by "3", rather than "2", "1", "0" and "3," or any other haphazard bead sequence and placement.

The computer-proctored embodiment provides enhanced scope for personalized interaction. For example, whenever the child correctly moves a Packet-Rank colored bead/icon to cover-up the "2" bead site in the Packet-Rank on the row of Digit-Squares representing the inventory of candy in some storyline pantry, this change of state triggers the computer-proctored display and voice system to respond, "The new packet added makes three packets of candy in the pantry."

All other modes of exposition parallel to the tangible and digital game board models and their co-related methods are also contemplated when future technology devises and implements new interaction devices. Such interaction devices include virtual reality 3D configurations, tangible 3D configurations and directly mapping real fingers and finger patterns to virtual digit configurations, along with co-related gestures and words animating the methods by which a game scenario is played out.

BRIEF DESCRIPTION OF THE DRAWING FIGURES

FIGS. 6A to 6K and 6AA to 6KK illustrate ten stencils and a TEN chip along the left margin with their bead pattern counterparts along the right margin.

Figure 7:
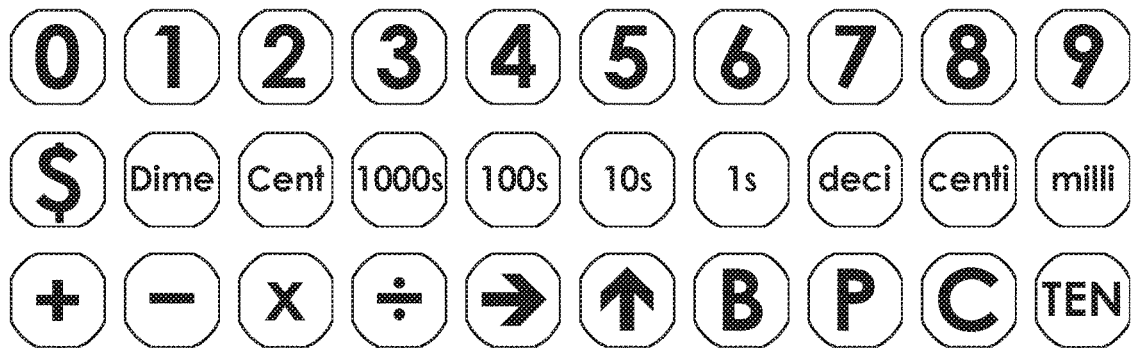

FIG. 7 illustrates examples of typographic symbols on a typical set of chips.

FIGS. 8A to 8E illustrate modification means for radix 2, 8, 12, 16 and 60 arithmetic.

Figure 9A:
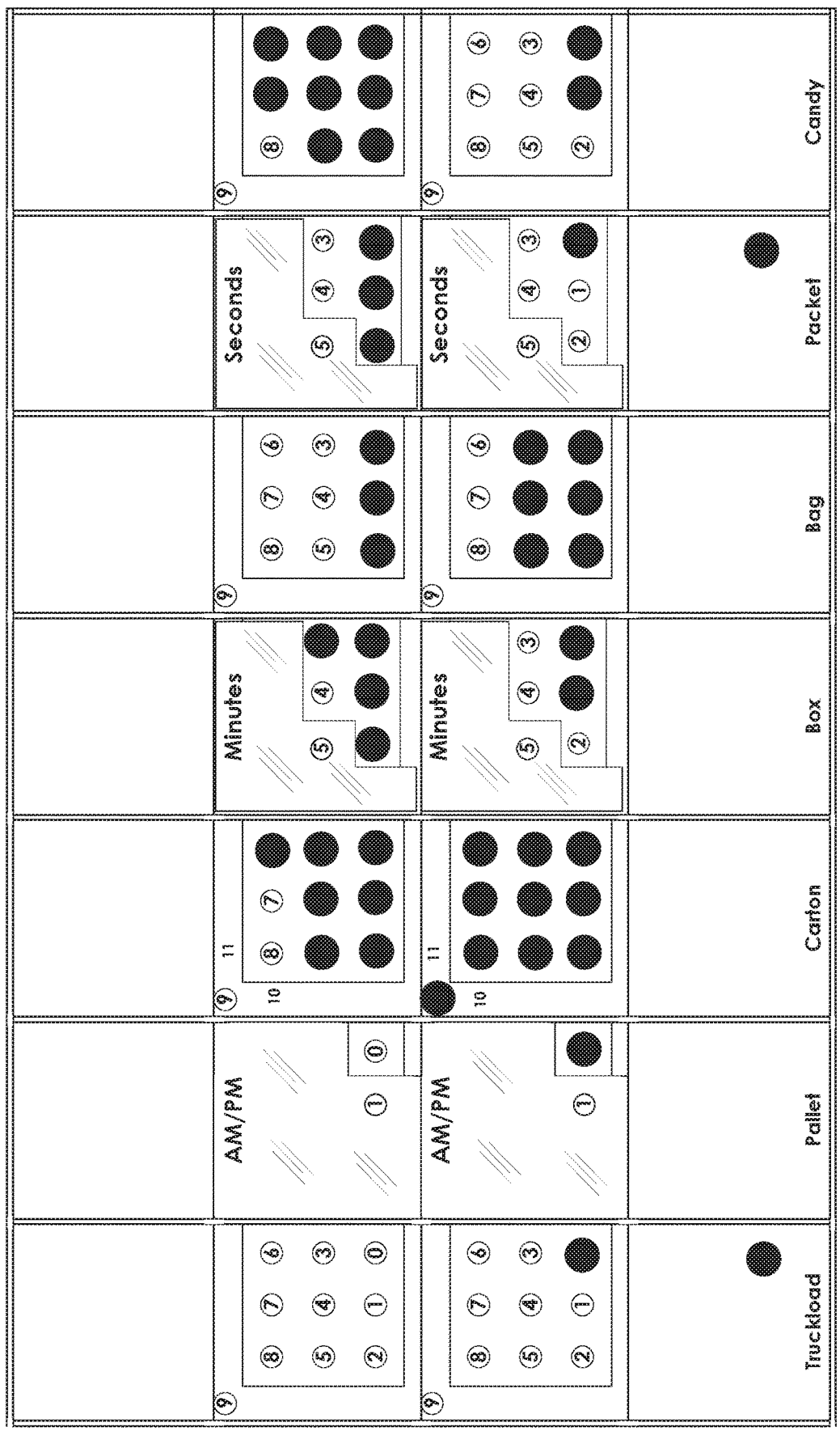
Figure 9B:
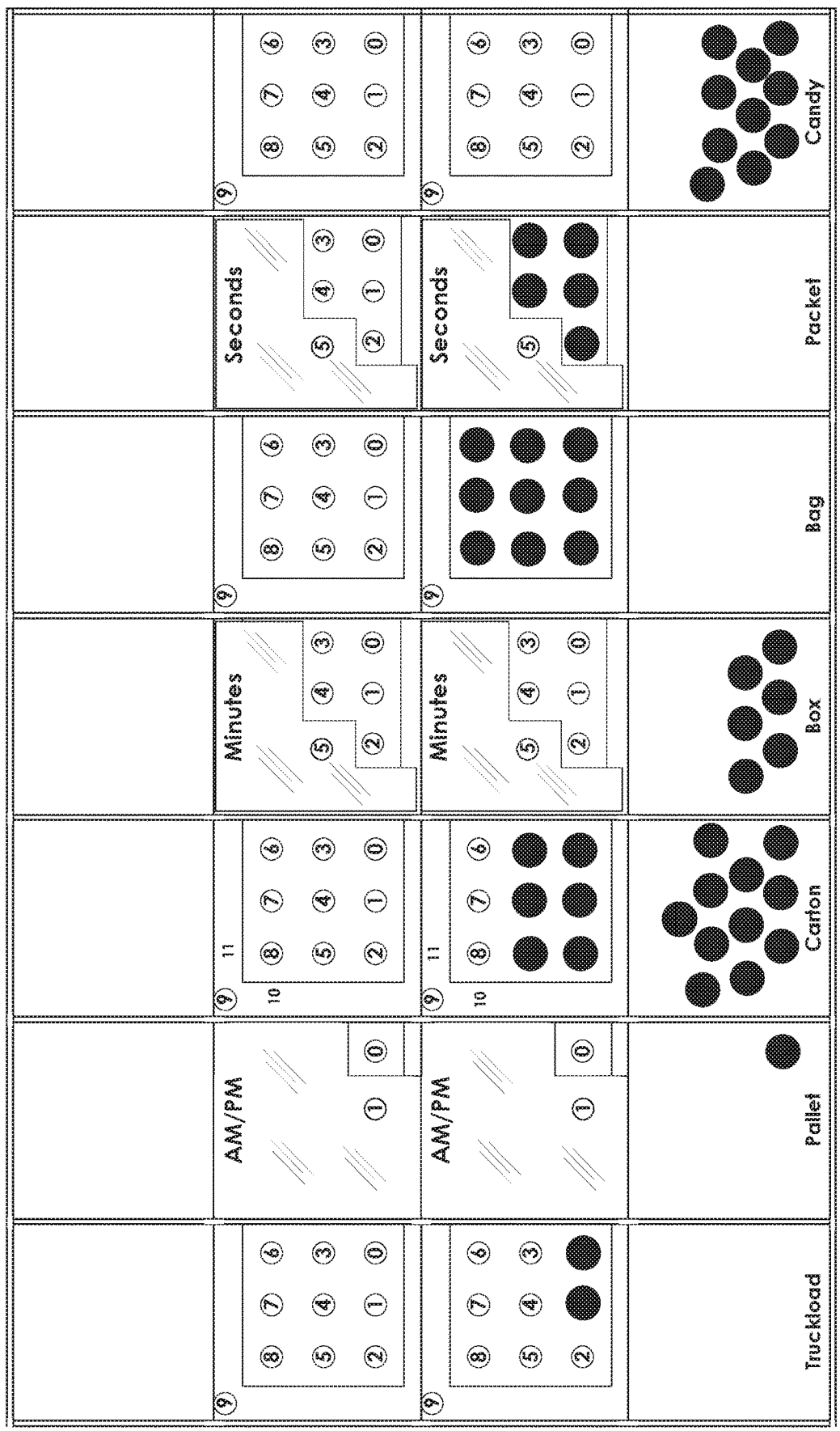

FIGS. 9A and 9B illustrate mixed-radix day:hour and min:sec clock tessellation on the Candy Board in a worked example.

FIGS. 10A to 10D illustrate plosive-state equilibration normalizing plosive-state TENs into canonical form in a worked example.

FIG. 11 is a sample table of the 632M method expressed in pencil-on-paper form showing symmetry and simplicity.

DETAILED DESCRIPTION OF EXEMPLARY EMBODIMENTS OF THE INVENTION

Figure 1A:
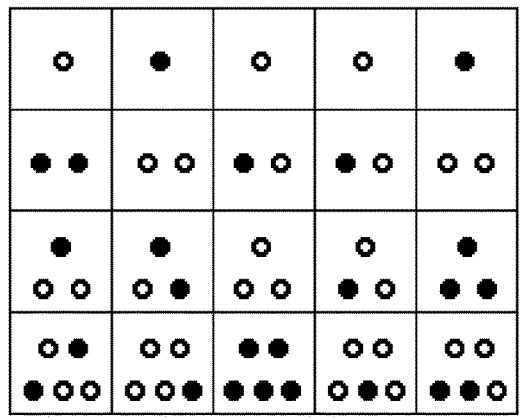
FIG. 1A is a sketch of a single-row, five order of magnitude Ayala Yupana that is presumed to be prior art of ancient Inca.
Figure 1B:
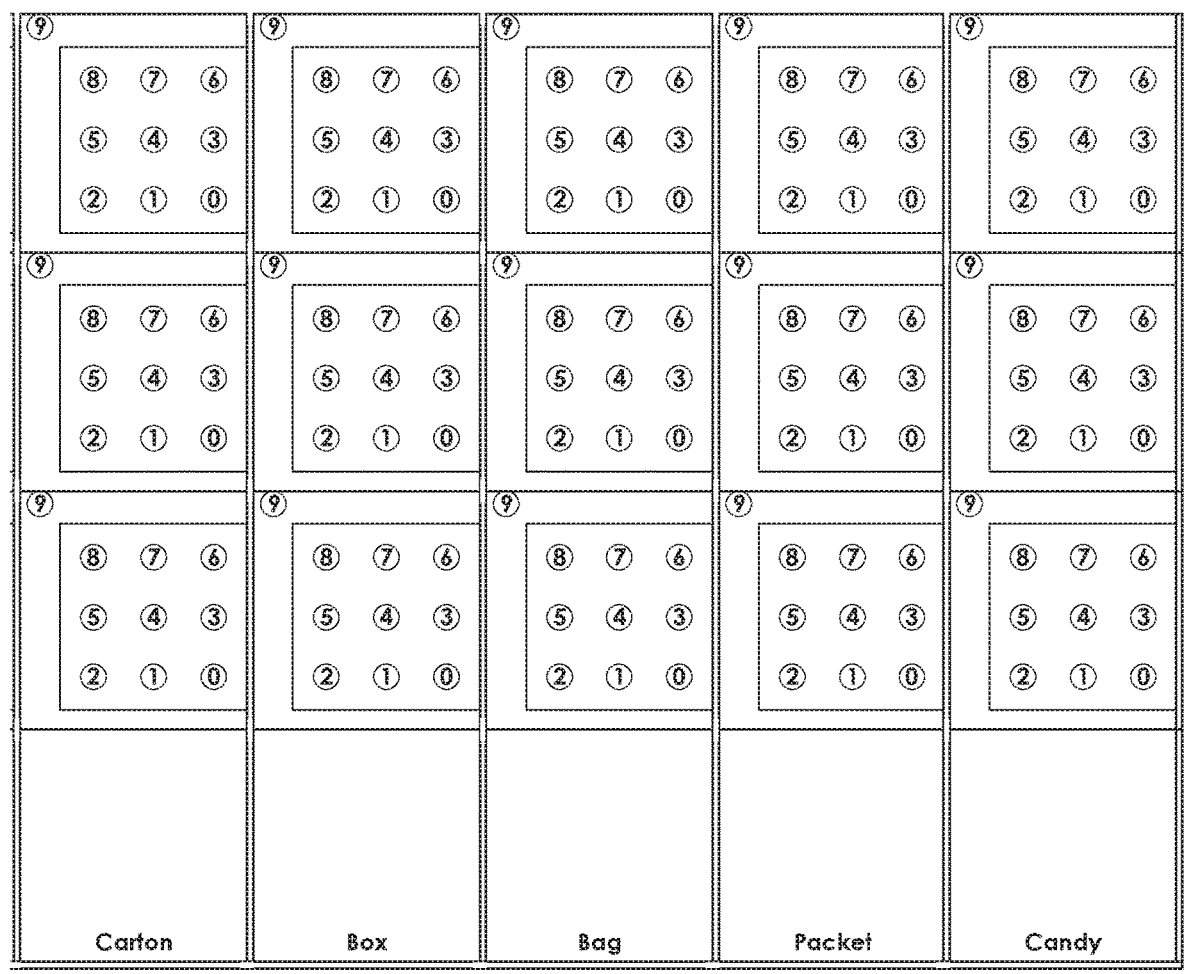
FIG. 1B depicts a three-row, five order of magnitude Candy Board.

FIG. 1B depicts an exemplary embodiment of a three-row five order of magnitude Candy Board according to the present invention. The Candy Board comprises a plurality of Digit-Squares 27 and Trays 28. A typical Digit-Square 27 is depicted in a plan view in FIG. 2A and in section views in FIG. 2B and FIG. 2C taken along the lines indicated in FIG. 2A. Each Digit-Square 27 has a plurality of bead sites 11, 17 and an appropriate glyph 10 is imprinted within each bead site 11, 17 on the tile. Each Digit-Square 27 further has a right bead-control fence 12, a left bead-control fence 13, a first horizontal channel 14, a second horizontal channel 15 and a vertical channel 16. The channels 14, 15, 16 frame three corresponding edges 14A, 15A, 16A that define a bead site plateau region of the Digit Square 27. A typical Tray 28 is depicted in a plan view in FIG. 3A and in section views in FIG. 3B and FIG. 3C taken along the lines indicated in FIG. 3A. Each Tray 28 has three fences 21, 22, 23 that enclose the Tray on three sides to confine instruction pieces 24 to a given rank on the Candy Board. The instruction pieces 24 are also referred to herein as "beads" and may comprise relatively small, round, ovulate, finger-friendly edible candy, such as M&M'S® candies, SKITTLES® candies or the like.

Figure 2A:
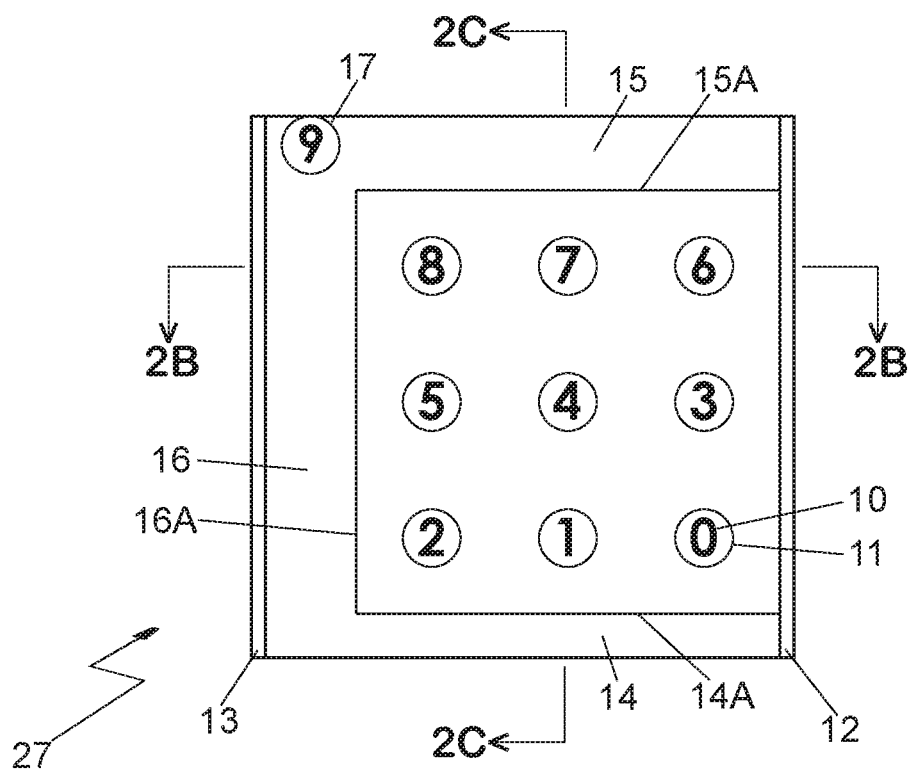
FIGS. 2A, 2B, 2C depict a radix-10 Digit-Square in plan and elevation views, wherein tessellation interconnects are not shown for purposes of clarity.
Figure 2B:
Figure 2C:
Figure 3A:
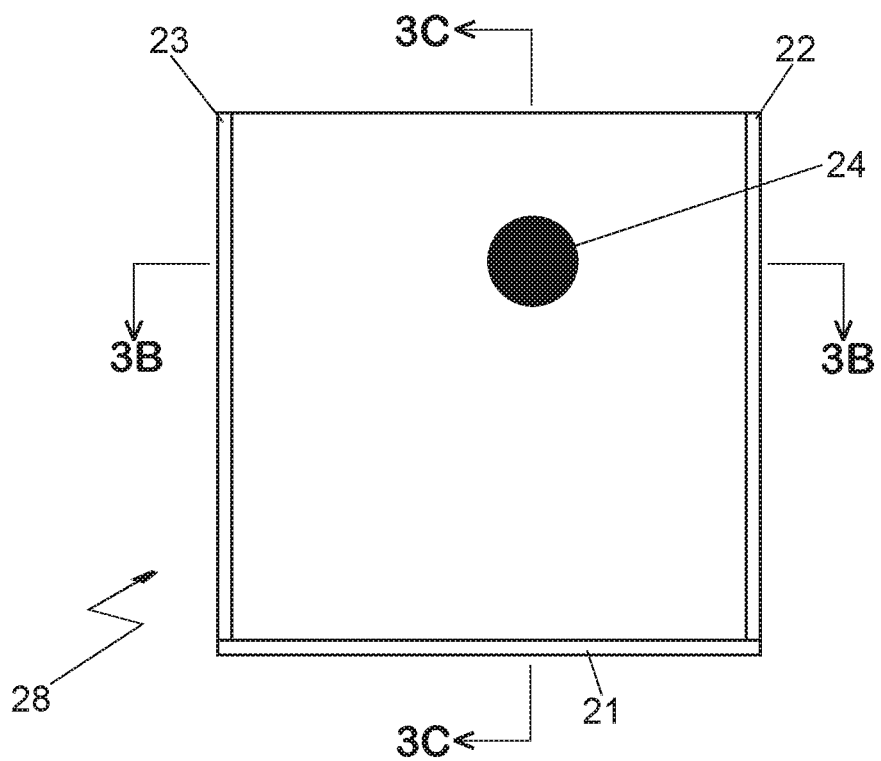
FIGS. 3A, 3B, 3C depict a Tray with one bead in plan and elevation views, wherein tessellation interconnects are not shown for purposes of clarity.
Figure 3B:
Figure 3C:
Figure 4:
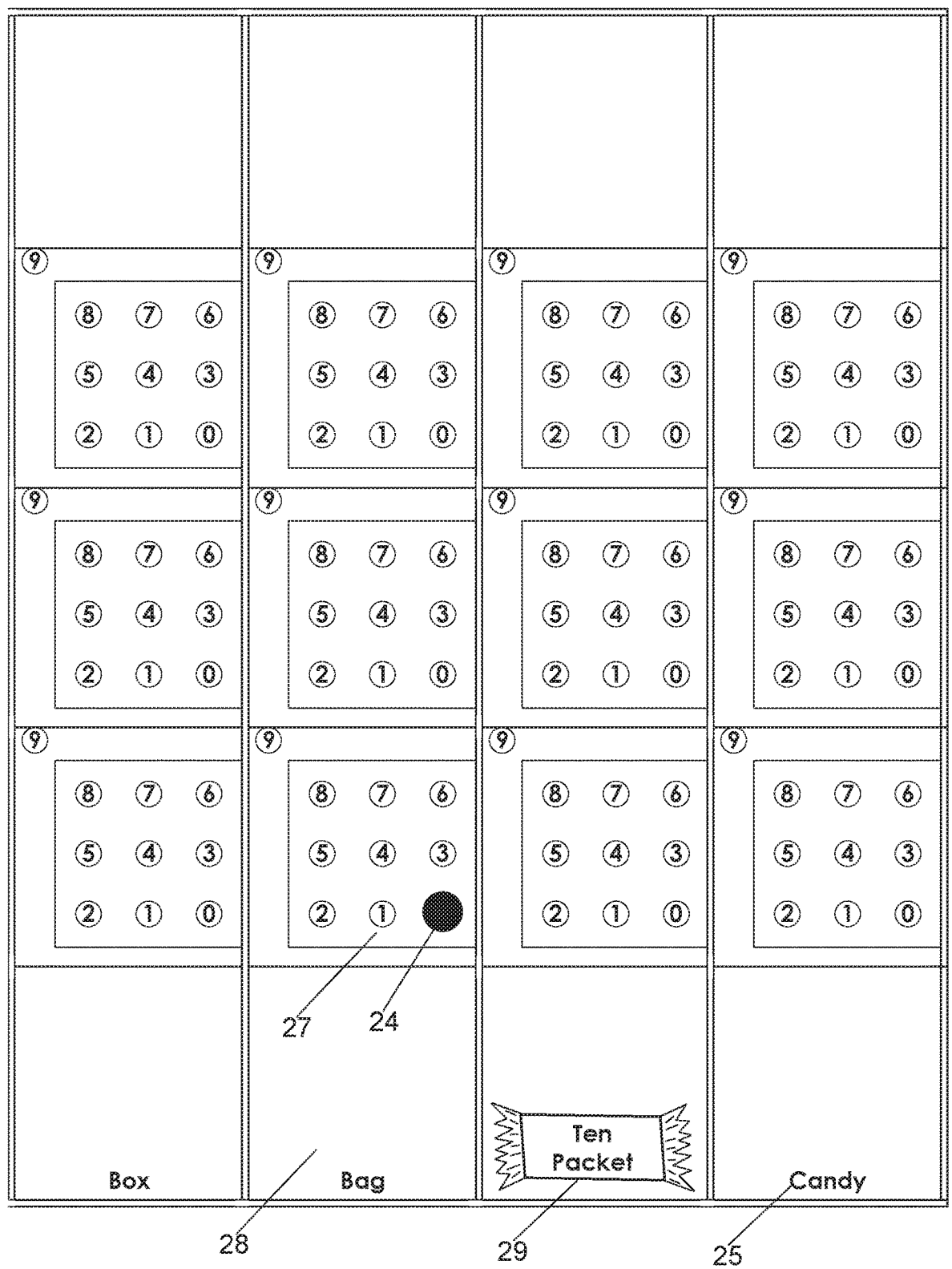
FIG. 4 depicts a Candy Board having three rows of Digit-Squares, with top and bottom Trays.
Figure 5:
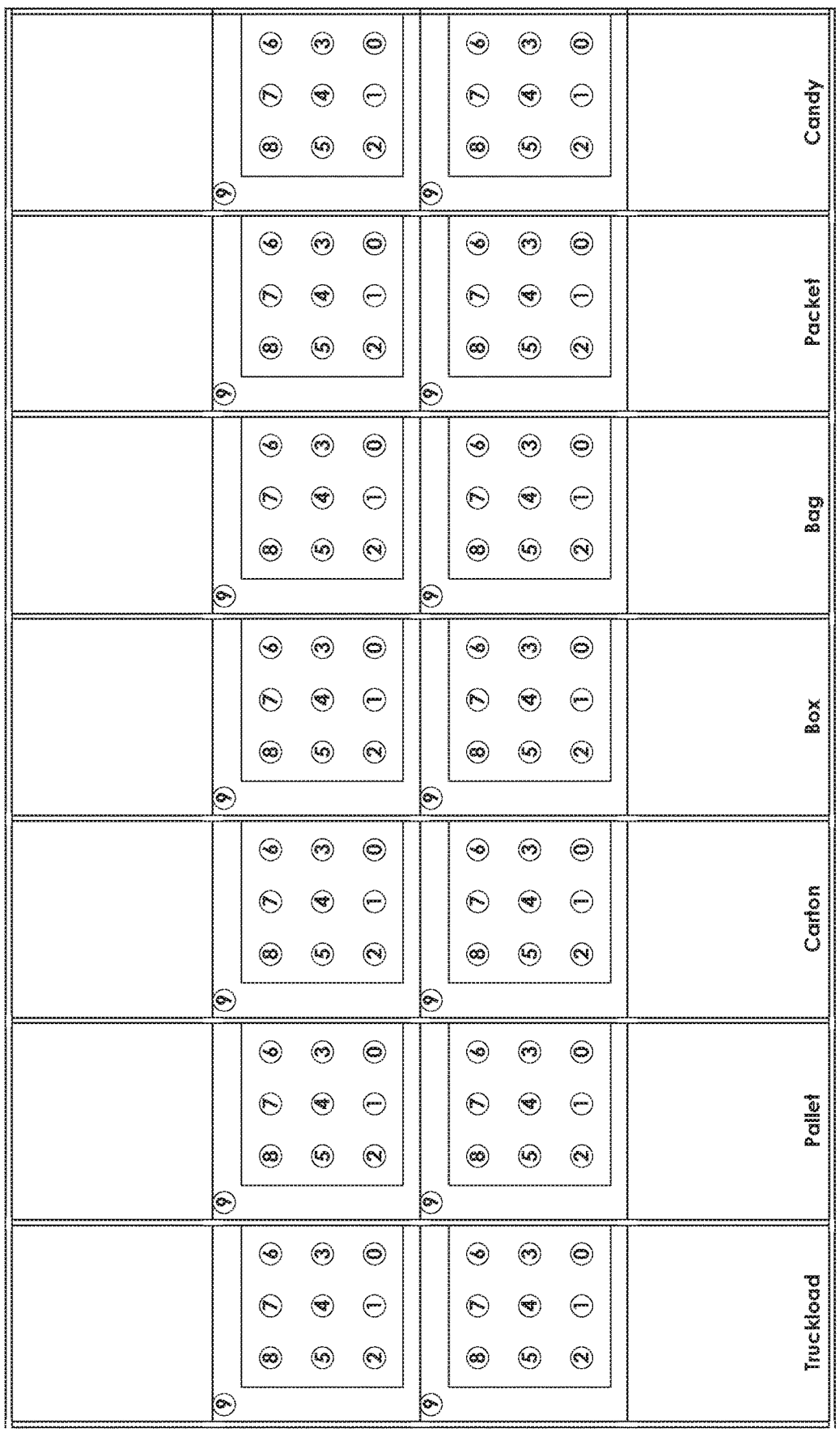
FIG. 5 depicts a Candy Board having two rows of Digit-Squares, with top and bottom Trays.

FIG. 4 depicts another exemplary embodiment of a Candy Board according to the present invention having three rows of Digit-Squares 27, with top and bottom Trays 28. The three-row four rank Candy Board depicted in FIG. 4 has an alphanumeric decal 25 indicating the "Candy" rank and an alternative clipart decal 29 indicating the higher "Packet" rank that tessellates leftward from the Candy rank. FIG. 5 depicts another exemplary embodiment of a Candy Board according to the present invention having two rows of Digit-Squares 27, as depicted in FIG. 2A, with top and bottom Trays 28, as depicted in FIG. 3A.

FIGS. 6A to 6J illustrate stencils 30-39 that may be provided with optional printed indicia and/or optional openings or cutouts 40-49. The bead-pattern counterparts to the stencils 30-39 are illustrated in the corresponding FIGS. 6AA to 6JJ. When placed over a Digit-Square 27, the stencils 30-39 are the preferred means for enforcing the setup of the correct stencil-specific bead count and bead-pattern counterpart. The cutouts 40-49 permit the underlying glyph 10 printed in the corresponding bead site on the Digit-Square 27 to be visible through the stencil, which reinforces bead pattern to numeric symbol association. The cutouts 40-49 may also function as plosive-state bead sites.

Figure 6A:
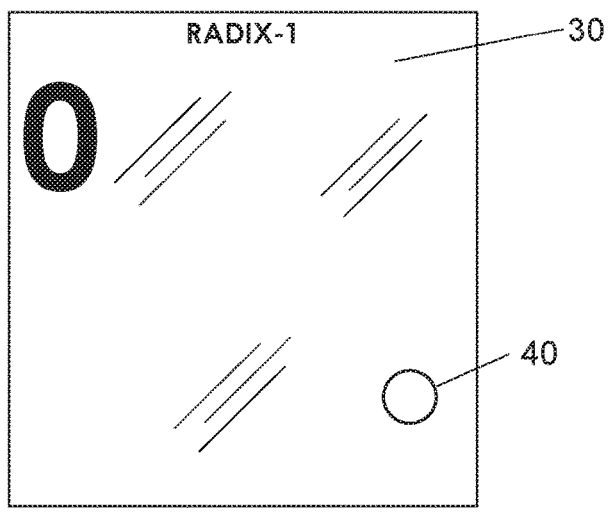
Figure 6A:
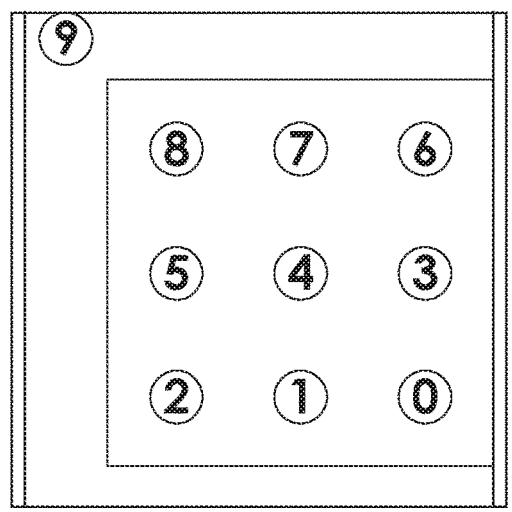
Figure 6B:
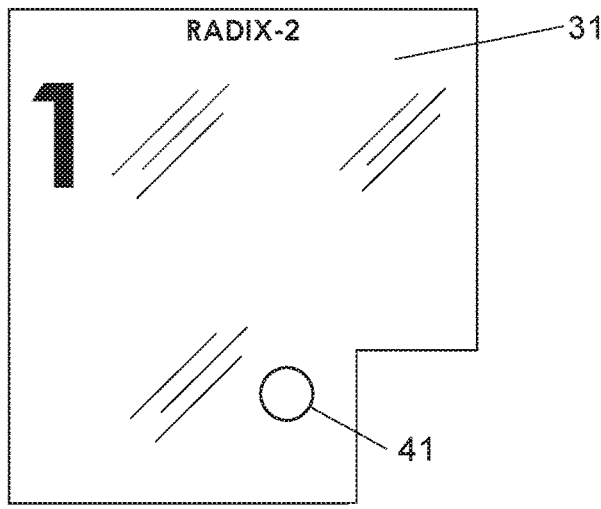
Figure 6B:
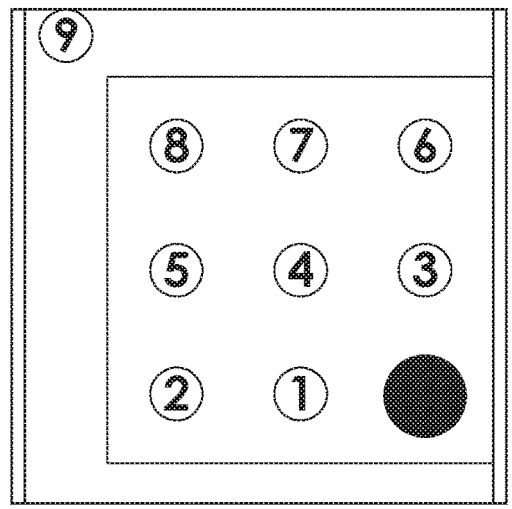
Figure 6C:
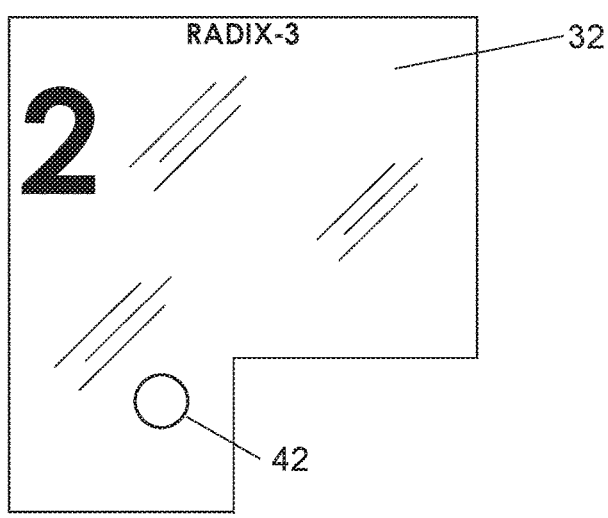
Figure 6C:
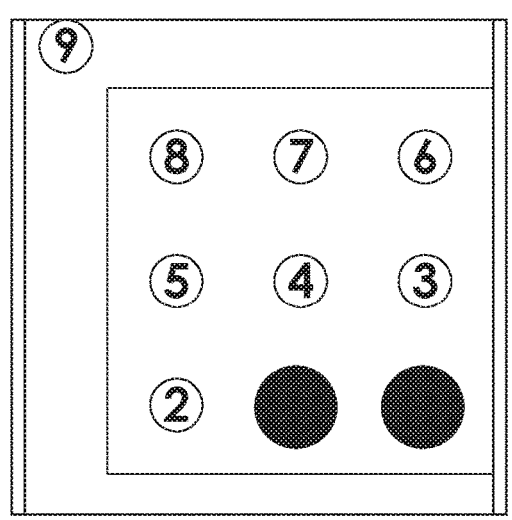
Figure 6D:
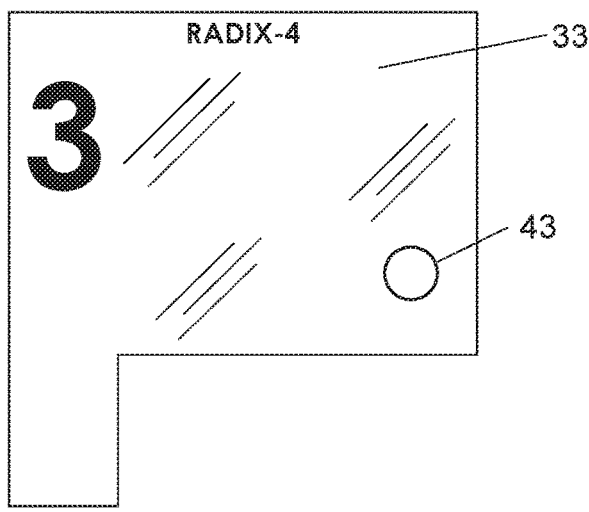
Figure 6D:
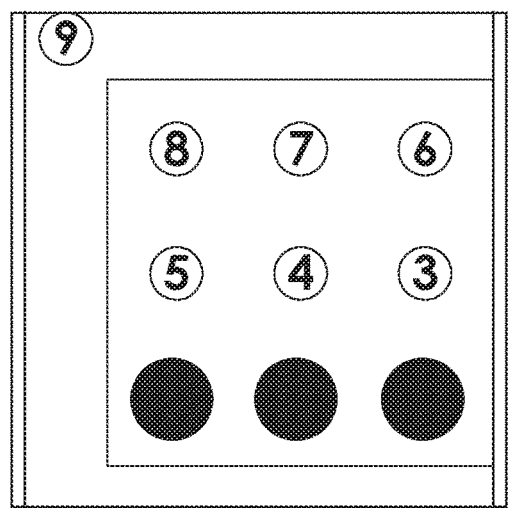
Figure 6E:
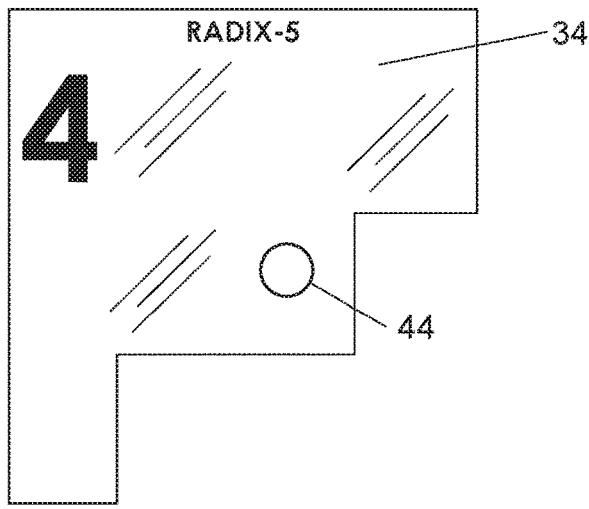
Figure 6E:
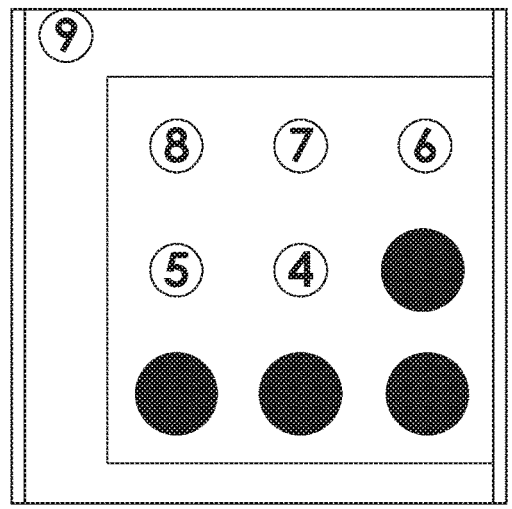
Figure 6F:
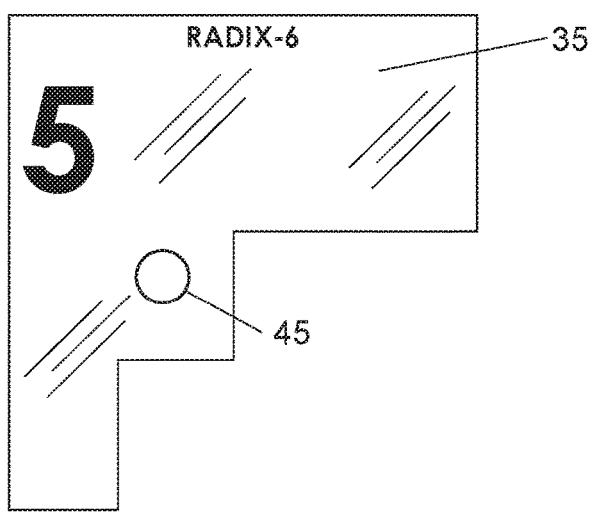
Figure 6F:
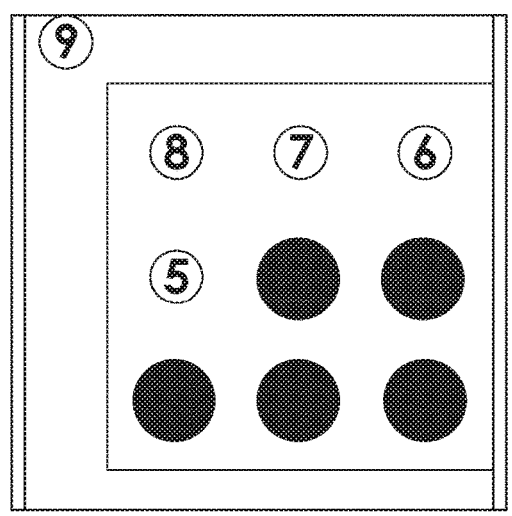
Figure 6G:
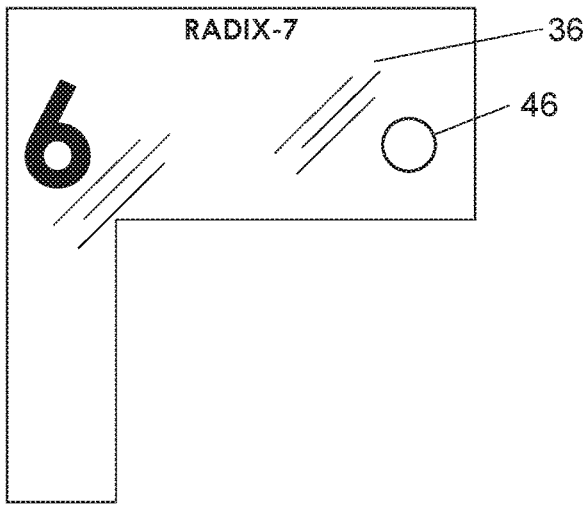
Figure 6G:
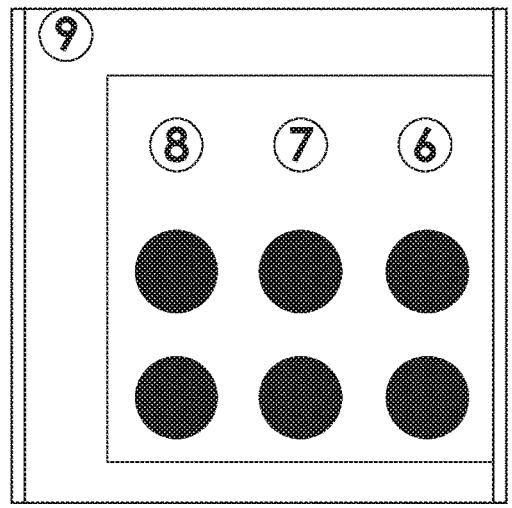
Figure 6H:
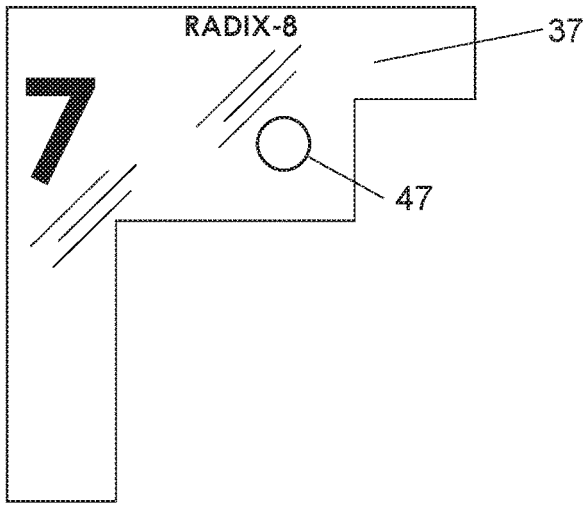
Figure 6H:
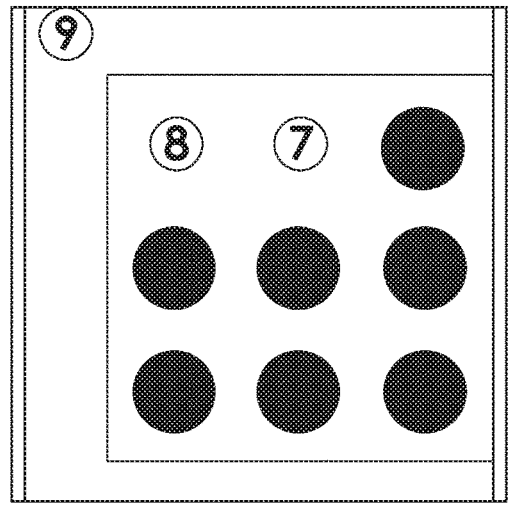
Figure 6I:
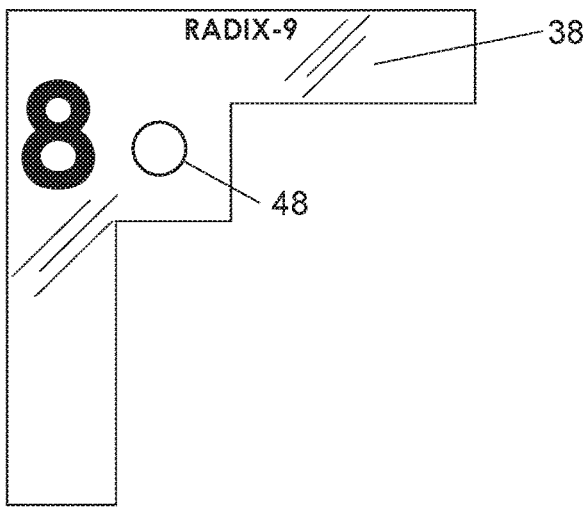
Figure 6I:
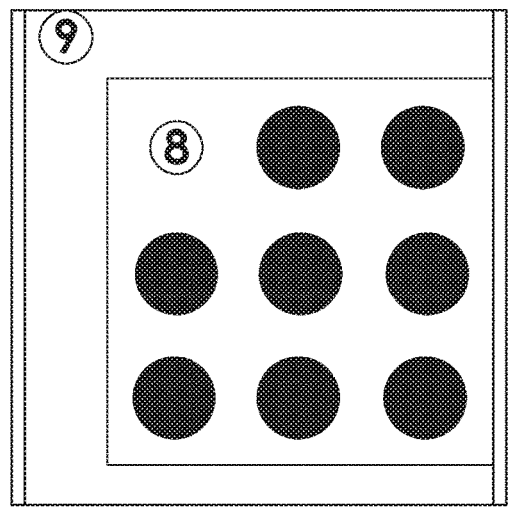
Figure 6J:
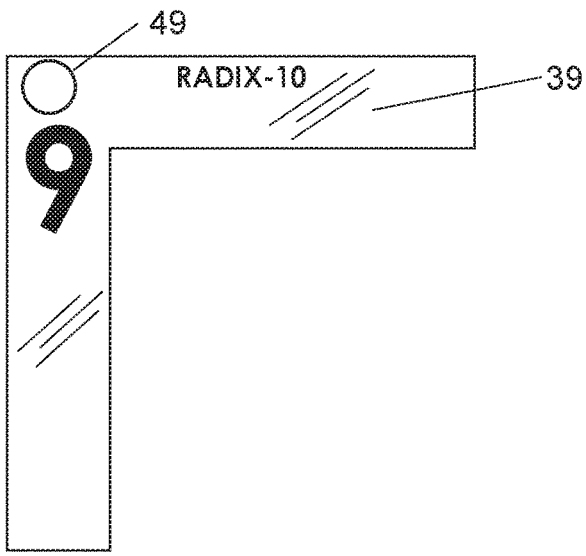
Figure 6J:
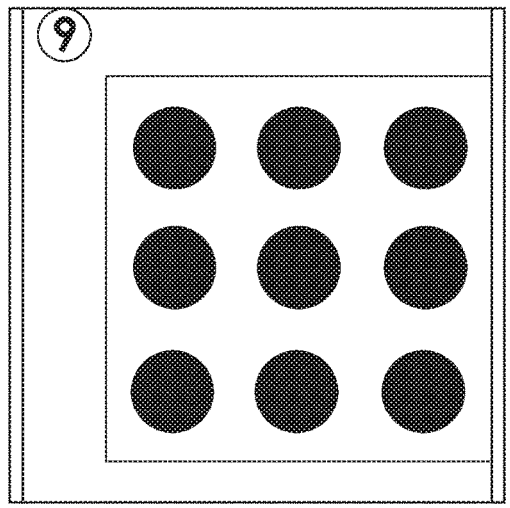
Figure 6K:
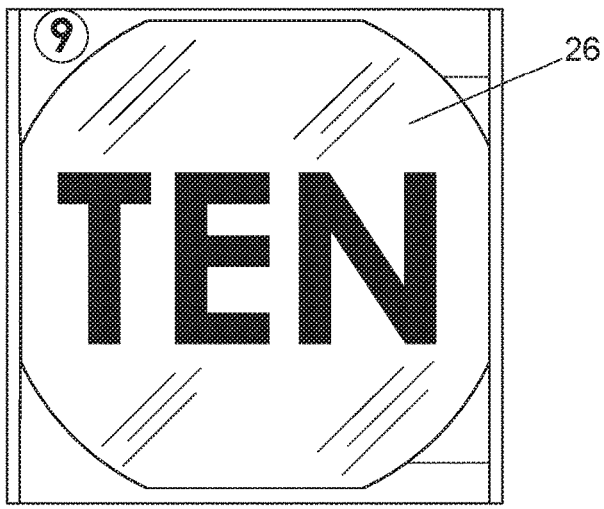
Figure 6K:
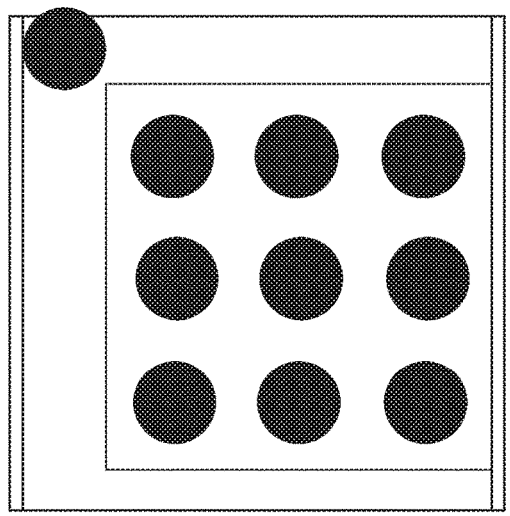

FIG. 6K and FIG. 7 illustrate that one or more indicia bearing chips 26 as a set may act as substitutes for beads laid on a Digit-Square 27. In one embodiment, chips 26 may serve as the primary means for weaning a child away from bead patterns. In another embodiment, chips 26 may serve as one means for manifesting algebraic substitution on the Candy Board.

FIGS. 8A to 8E illustrate another exemplary embodiment of the invention including modification means for radix 2, 8, 12, 16 and 60 arithmetic. FIGS. 9A and 9B illustrate another embodiment of the invention including mixed-radix day: hour and min:sec clock tessellation on the Candy Board in a worked example. FIGS. 10A to 10D illustrate another embodiment of the invention including plosive-state equilibration normalizing plosive-state TENs into canonical form in a worked example. FIG. 11 illustrates yet another exemplary embodiment of the invention in a sample table of the 632M method expressed in pencil-on-paper form showing symmetry and simplicity.

Because modeling and game play on the apparatus is straightforward to anyone knowledgeable in the art, the two essential methods that completely cover the use of the apparatus for doing Addition, Subtraction, Multiplication and Division will provide details on use of the apparatus.

Example 1: The Method of Plosive-State Equilibration

Plosive-state equilibration is how the Candy Board emulates the pencil-on-paper methods called "Carry" and "Borrow." Plosive-state equilibration is the preferred method for one tile group/rank to interact with another tile group/rank. On the Digit-Square 27, a plosive-state lock up occurs when beads occupy every allowable bead site. As depicted in FIG. 2A, the "9" bead site 17 is preferably located on the Digit-Square 27 at the junction of the horizontal channel 15 and the vertical channel 16. Once a bead occupies this bead site during the operation of "Addition," namely the amalgamating of two values on two rows on a Candy Board, it physically blockades further bead-in-channel sliding onto the Digit-Square 27. This physical lock-up manifests what is called a plosive-state TEN, i.e. the bead count and bead pattern depicted in FIG. 6KK.

More generally described, the method of plosive-state equilibration is triggered whenever a plosive-state bead condition arises on a tile during an operation in progress. Preferred tile designs employ a bead site layout that causes a physical lock-up that arrests further bead play. In order for the operation to proceed further, the method of plosive-state equilibration must resolve the lock-up. Thereafter the operation in progress may resume. Otherwise the operation in progress must abort and perform a related exception state process.

Figure 8A:
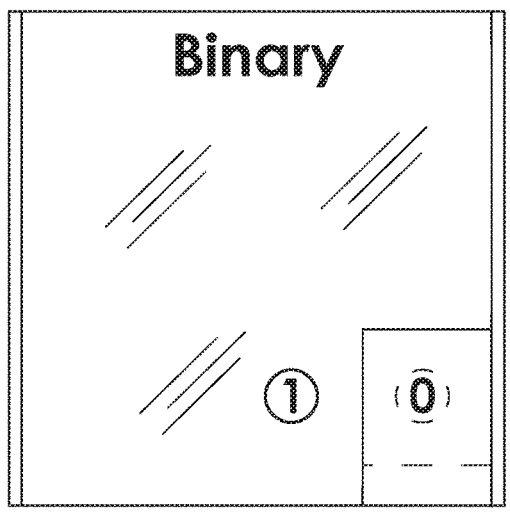
Figure 8B:
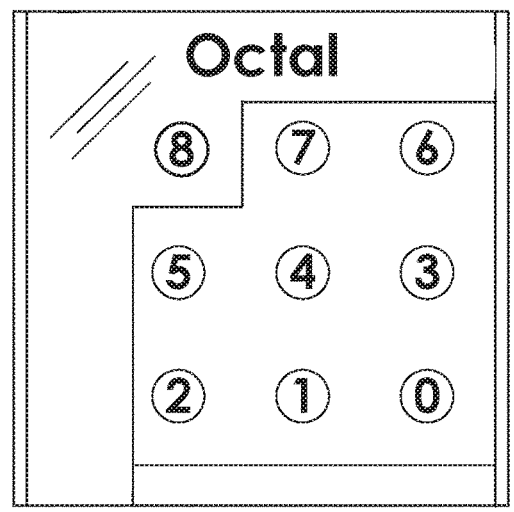
Figure 8C:
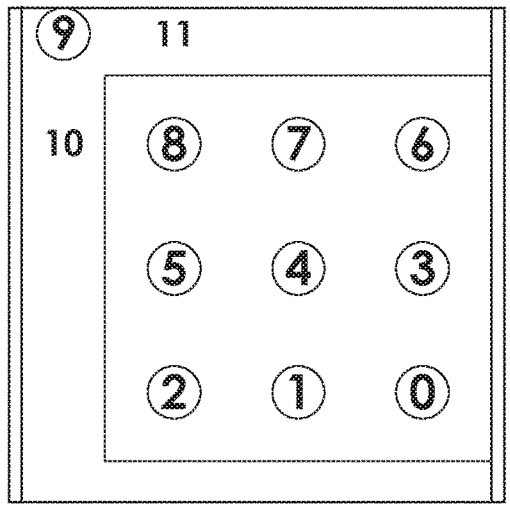
Figure 8D:
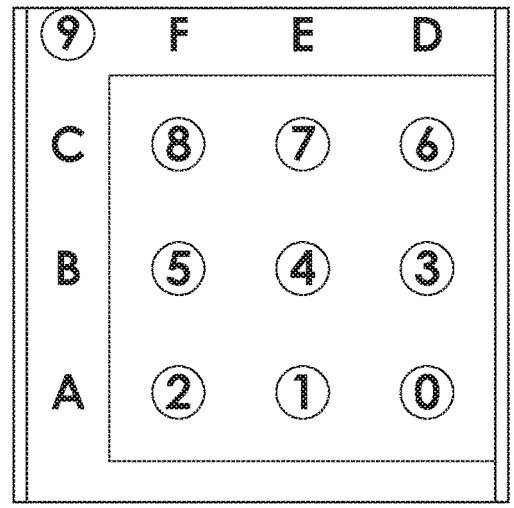

A cogently designed bead-on-tile model is admirably suited for handling many seemingly complex problems. For example, mixed-radix systems such as days, hours, minutes, and seconds, can be represented and operated on to solve a complex problem. As depicted in FIG. 9A, dual Digit-Squares are used for seconds and minutes. The hours are split into two one-dozen intervals, one for "AM" and one for "PM". The first rank of the hours uses the radix-12 Digit-Square kludge as depicted in FIG. 8C. The AM/PM rank uses a radix-2, binary stencil adapted from the basic form of FIG. 8A. Days are radix-10. FIGS. 9A and 9B illustrate how the Candy Board handles mixed-radix arithmetic when 7 hours, 43 minutes and 38 seconds is added to 1 day, 10 pm, 26 minutes and 12 seconds.

Figure 8E:
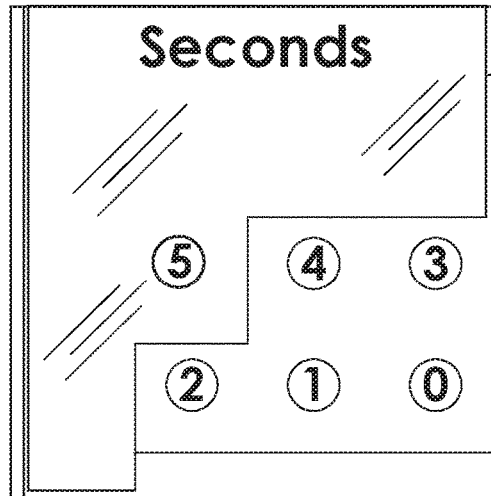
Figure 8E:
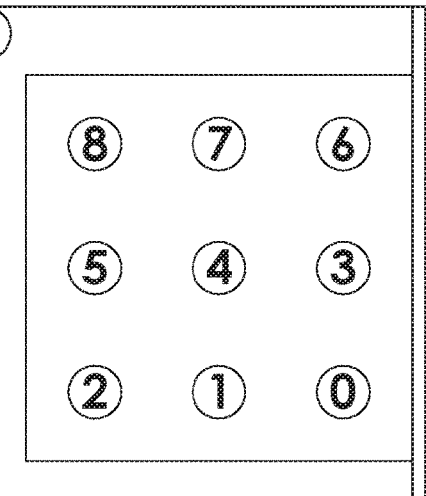

Rigor makes for relatability. In the clock tessellation, a dual Digit-Square subassembly emulates radix-60 via a specialized stencil. FIG. 8E depicts the use of a "Seconds" stencil in which a cutout set in the "5" location when placed atop a Digit-Square allows the "5" glyph to show through. For example, with five beads on the left Digit-Square and nine on the right, a typographic value "59" is displayed. Add 1 second to "59" and plosive-state TEN lock-up occurs, i.e. "STEN". Plosive-state equilibration of TEN causes a sixth bead to socket atop the plosive-state "5" cutout on the stencil, which occludes the "5" glyph printed on the tile bead site, i.e. a second plosive-state lock-up has occurred. Under the rule of rippling, after a second plosive-state equilibration takes place the Candy Board becomes "100", namely, 1 minute, 00 seconds in canonical form. Rippling is demonstrated in FIGS. 10A through 10D where "199" plus 1 ripples via plosive-state equilibration into the canonical form "200". This might seem tedious overkill, but the apparatus enforces rigor in order to provide a child the visual and tactile means to walk through and demystify quantitative processes step by step.

During the operation of "Subtraction," the initial setup on a two Digit-Square row Candy Board sites the Subtrahend on the bottom Digit-Square row and the Minuend on the top Digit-Square row. The goal is to completely zero-out the Minuend. Subtraction is the game where a child slides beads from top and bottom Digit-Square rows simultaneously, placing them in the adjacent top and bottom Trays. A "Borrow" lock-up condition arises when the subtrahend in the focus rank runs down to zero beads, but beads still remain in the minuend. In this event, plosive-state equilibration under subtraction, dictates that a bead in the next higher rank of the subtrahend is slid into the Tray, and ten beads in the focus subtrahend rank are slid from the Tray to saturate every bead site in the focus Digit-Square of the subtrahend, forming the TEN bead pattern of FIG. 6KK. The method is equivalent to breaking a one dollar bill into ten dimes. With the lock-up resolved, the child resumes simultaneous bead sliding from both minuend and subtrahend Digit-Squares until the minuend is zeroed-out. This process applies generally. Consider the mixed-radix clock problem for subtraction. Starting with the layout of FIG. 9B, the child places 7 hours, 43 minutes and 38 seconds in the top Digit-Square row, namely the minuend, as depicted in the top Digit-Square row of FIG. 9A. After subtraction concludes the subtrahend is 1 day, 10 pm, 26 minutes and 12 seconds, as depicted in the bottom Digit-Square row of FIG. 9A, and the top Digit-Square row is now zeroed-out completely, as depicted in the top Digit-Square row of FIG. 9B.

Figure 10A:
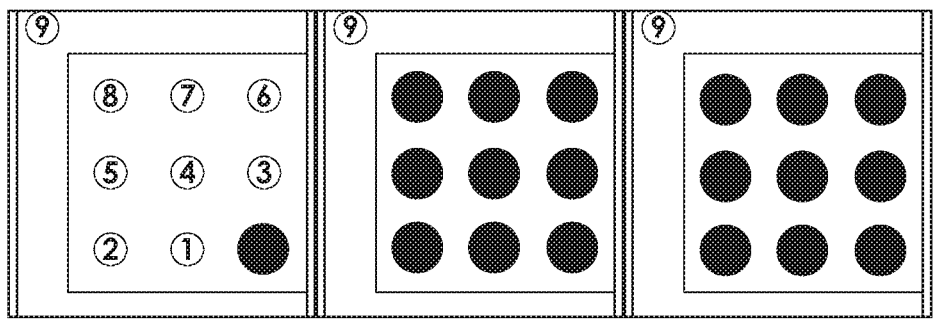
Figure 10B:
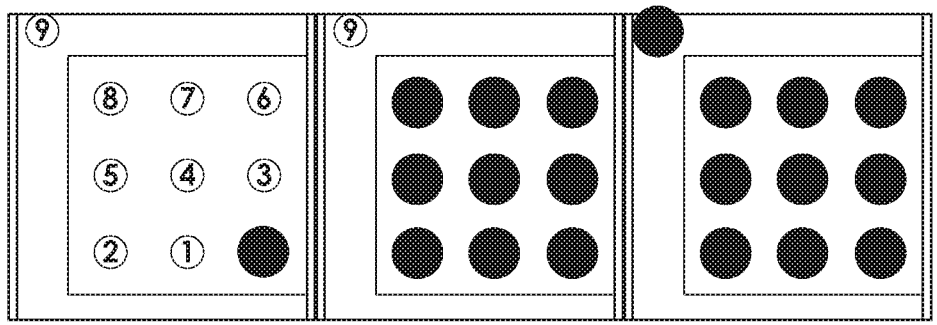
Figure 10C:
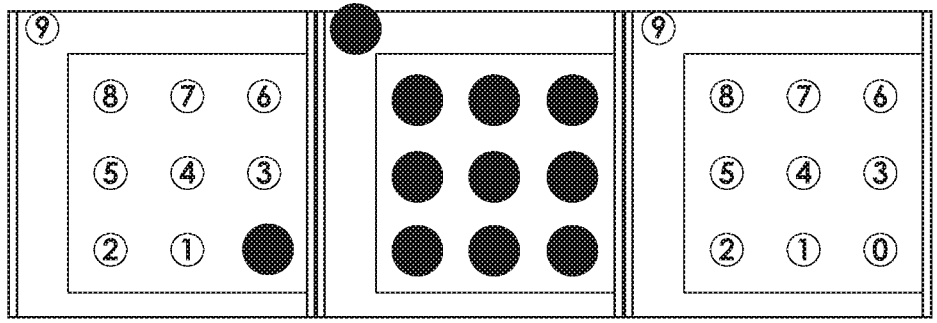
Figure 10D:
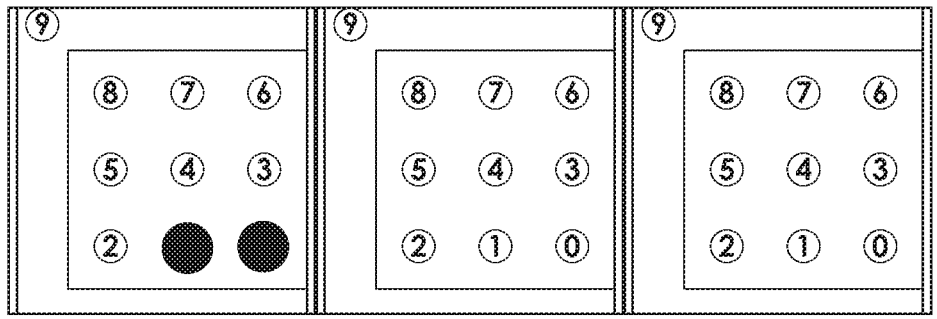

Plosive-state equilibration is also the means for exploded value representations to normalize into canonical representations and visa-versa. For example, on the Candy Board during addition, a candy packaging operation converts plosive-state TEN Candies into 1 Packet, 0 Candies, namely "10" in the canonical form adults speak aloud as "ten." FIGS. 10B through 10D depict "19TEN" resolving to "1TEN0" resolving to the canonical written form "200."

Example 2: The Method of 632M on the Candy Board

Super-subitization breaks the Digit-Square states "0" through "9" into two components. The "Spine" components 6, 3, 0, (vertical axis) and the "Rib" components 2, 1, 0 (horizontal axis), except that "9" is 6+3. This formulation creates a bi-level tree representing every digit. The Spine+Rib approach gives rise to the 632M-Table which handily slays the so-called complex operations of multiplication and division, as illustrated via pencil-on-paper form in FIG. 11.

The M in 632M denotes the baseline multiplicand or the divisor value relevant to the problem, also called 1M M-value associated with the 1S S-value. The "632" designates three other S-values, namely 6S, 3S and 2S, being the additional multiples of 1M, calculated via three addition operations.

The method of 632M multiplication and quotient auto-generation enables children to do multiplication and division without multiplication tables, without the need for memorizing them, without doing single digit multiplication in their heads, and without guess-estimating a candidate quotient digit, rather the quotient is auto-generated as 632M division unfolds. The method requires 1.4 additions or subtractions for each multiplier or quotient digit on average.

The 632M-Table, manifested in the form of a Candy Board, called the 632M-Board, comprises a column for four S-values with an adjoining column for the four M-Values, where the column is one rank higher than the 1M value, so the highest possible 6M value is accommodated. Illustrating a pencil-on-paper breakdown of the 632M method, FIG. 11 highlights the symmetry inherent to multiplication and division when dissected through the lens of super-subitization. With an M value of 462, the 632M-Table appears as dual, side by side 632M tables in the top/center of FIG. 11. The S-values appearing in the center vertical column 6, 3, 2, 1 (or M), denote multiples of the baseline multiplicand or the divisor values, as the case may be. S-values are used in an automated version of the cascade process, called While-loop Cascading, whereby the 632M method and the 632M-Table can be generalized for operations in radix systems other than radix-10.

Furthermore, the method of 632M is open to obvious optimization, such as a fall through execution tree requiring at most two M-value operations. Certain digits repeated in a multiplier may give a better M-value selection, such as 532M, for example, whenever 5's outnumber 6's by two to one and 9's are scarce. Similarly, for 742M and 732M, which have an overhead of four additions to setup the M-Table, but otherwise super-subitize over radix-10 as well as 632M does, and are optimal for radix-11, as well. Similar extensions of the method apply to other radixes. For example, using a nine M-value 50/40/30/20/10/632M-Table with its setup overhead of nine additions, radix-60 arithmetic requires no more than 3 operations per step.

The setup of a four row 632M-Board executes as follows: Step (A): Setup a series of S-values from top to bottom rows, namely 6, 3, 2, 1 in the S-value field of the 632M-Board. Step (B): Setup the 1M value on both the bottom, next row up and top row (S=1, 2, 6 rows). Step (C): Add the bottom row into the next row up, which yields 2M in the S=2 row. Step (D): Duplicate the 2M value into the row above it (S=3 row). Step (E): Add the topmost row (S=6) downwards into the row beneath, which yields 3M in the S=3 row. Step (F): Duplicate the 3M value into the topmost row and the bottom row (S=1 and 6 rows). Step (G): Add the bottom row into the topmost row, which yields 6M in the topmost row. As an alternative, double the topmost row in-situ, which makes needless the Step (F) process of duplicating 3M into the bottom row. Step (H): Finally, setup the 1M value in the bottom row (S=1).

A 632M-Board detached from the Candy Board facilitates both rank shifting and duplication of M-value presets onto the Candy Board in the partial product row during multiplication and the divisor/subtrahend row during division. A child merely needs to replicate the add-shift process for multiplication or the subtract-shift process for division, as illustrated in FIG. 11, using the 632M-Board as the template for setting up values on the Candy Board.

That which is claimed is:
1. An apparatus for providing instruction, comprising:

at least one instruction tile, the instruction tile defining a plurality of instruction locations arranged in a predetermined pattern on a generally planar surface of the instruction tile; and at least one instruction piece configured to be received on one of the plurality of instruction locations in a predetermined sequence;

wherein at least one of the instruction locations represents a change of state in an instruction operation when the instruction piece is received on the one of the plurality of instruction locations; and wherein the plurality of instruction locations is arranged within a predefined plateau region on the surface of the instruction tile and the instruction tile further defines a saturation state instruction location that is not within the predefined plateau region.

2. The apparatus of claim 1, wherein each instruction location and the saturation state instruction location is defined by a recess formed in the surface of the instruction tile.

3. The apparatus of claim 1, wherein the predetermined pattern of the plurality of instruction locations comprises three (3) ascending rows having three (3) instruction locations within each row.

4. The apparatus of claim 3, wherein the predetermined sequence of the instruction locations comprises right-to-left in each ascending row.

5. The apparatus of claim 1, wherein the change of state in the instruction operation relates to at least one of mathematics and quantifiable sciences.

6. The apparatus of claim 1, wherein the plateau region is defined by two (2) generally horizontal channels and one (1) generally vertical channel formed in the surface of the instruction tile, and wherein at least one of the channels defines a sliding pathway for the instruction piece.

7. An apparatus for providing instruction, comprising:

an instruction board comprising at least one instruction tile having a plurality of instruction locations arranged in a predetermined pattern within a predefined area on a generally planar surface of the instruction tile, the predefined area being defined by a first horizontal channel, a second horizontal channel and a vertical channel extending between the first channel and the second channel, the instruction tile further having a saturation state instruction location on the surface of the instruction tile that is located within at least one of the first channel, the second channel and the vertical channel; and a plurality of instruction pieces configured to be received on the plurality of instruction locations and the saturation state instruction location;

wherein the plurality of instruction locations is arranged within a plateau region on the surface of the instruction tile and the saturation state instruction location is not within the plateau region.

8. The apparatus of claim 7, wherein a plurality of the instruction tiles are arranged contiguous to one another to form a tessellation that defines the instruction board.

9. The apparatus of claim 8, wherein an edge of a first instruction tile adjoins an edge of a second instruction tile to form the tessellation that defines the instruction board.

10. The apparatus of claim 7, wherein each of the plurality of instruction locations and the saturation state instruction location is a recess formed in the surface of the instruction tile.

11. The apparatus of claim 7, wherein each of the plurality of instruction locations and the saturation state instruction location represents a change of state in an instruction operation when the instruction piece is positioned thereon.

12. The apparatus of claim 7, further comprising at least one stencil configured for covering at least one of the plurality of instruction locations and the saturation state instruction location with the stencil overlaid on the instruction tile.

13. The apparatus of claim 7, further comprising a tray positioned adjacent the instruction tile and configured for retaining the plurality of instruction pieces.

14. The apparatus of claim 13, wherein at least the vertical channel and the tray are arranged to define a sliding pathway for the plurality of instruction pieces.

15. A method for providing instruction in plosive state equilibrium, comprising:

providing an instruction board formed from at least one instruction tile, each instruction tile having a plurality of instruction locations arranged in a predetermined pattern within a predefined area on a surface of the instruction tile and a saturation state instruction location that is not located within the predefined area;

providing a plurality of instruction pieces configured to be positioned on the plurality of instruction locations and the saturation state instruction location;

positioning at least one of the plurality of instruction pieces on the plurality of instruction locations and the saturation state instruction location in a predetermined order to perform a change of state in an instruction operation;

wherein the plurality of instruction locations is arranged within a plateau region on the surface of the instruction tile and the saturation state instruction location is not within the plateau region.

16. The method of claim 15, wherein the change of state in the instruction operation relates to at least one of an operation in mathematics and an operation in quantifiable sciences.

17. The method of claim 15, wherein the change of state in the instruction operation relates to at least one of addition, subtraction, multiplication and division.

18. The method of claim 15, wherein each of the instruction locations is defined by a recess formed in the surface of the instruction tile.

19. The method of claim 15, further comprising providing a plurality of the instruction tiles having at least one edge, and wherein the edges of adjacent instruction tiles abut one another to define a tessellation that forms the instruction board.

20. An apparatus for providing instruction, comprising:

at least one instruction tile having a plurality of instruction locations arranged in a predetermined pattern within a predefined area on the instruction tile, the instruction tile having a channel that frames an edge of the predefined area, the instruction tile further having a saturation state instruction location on the instruction tile that is remote from the predefined area and within the channel; and one or more instruction pieces to be received on the plurality of instruction locations and the saturation state instruction location in a predetermined order;

wherein the channel is configured for sliding the instruction pieces onto the instruction tile; and wherein an instruction piece that occupies the saturation state instruction location within the channel physically blockades sliding another instruction piece onto the instruction tile.

* * * * *